US012658046B2

(12) United States Patent (10) Patent No.: US 12,658,046 B2
Chen et al. (45) Date of Patent: *Jun. 16, 2026

(54) METHOD AND APPARATUS FOR ACQUIRING AND SENDING STATION INFORMATION, AND SIGNAL TRANSCEIVING SYSTEM

(71) Applicant: BOE TECHNOLOGY GROUP CO., LTD., Beijing (CN)

(72) Inventors: Naichuan Chen, Beijing (CN); Yangyang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 13 days.

This patent is subject to a terminal disclaimer.

(21) Appl. No.: 18/776,484

(22) Filed: Jul. 18, 2024

(65) Prior Publication Data

US 2024/0379002 A1 Nov. 14, 2024

Related U.S. Application Data

(63) Continuation-in-part of application No. 17/435,749, filed as application No. PCT/CN2020/132898 on Nov. 30, 2020, now Pat. No. 12,075,515.

(51) Int. Cl.
*G08G 1/14* (2006.01)
*H04W 4/44* (2018.01)

(52) U.S. Cl.
CPC .............. *G08G 1/143* (2013.01); *H04W 4/44* (2018.02)

(58) Field of Classification Search
CPC ........ G08G 1/143; G08G 1/164; G08G 1/095; H04W 4/44; G06V 20/52; G06V 20/58;
(Continued)

(56) References Cited

U.S. PATENT DOCUMENTS

2002/0069017 A1 6/2002 Schmier
2002/0099500 A1 7/2002 Schmier
(Continued)

FOREIGN PATENT DOCUMENTS

CN 101465055 A 6/2009
CN 102075817 A 5/2011
(Continued)

OTHER PUBLICATIONS

Notice of Allowance from U.S. Appl. No. 17/435,749 dated Apr. 24, 2024.
(Continued)

*Primary Examiner* — Sisay Yacob
(74) *Attorney, Agent, or Firm* — Calfee, Halter & Griswold LLP

(57) ABSTRACT

A method for sending vehicle station information, implemented by a first processor provided at a vehicle station, includes: establishing a communication link with a vehicle; obtaining environmental video data corresponding to a preset range of the vehicle station; and receiving a driving parameter of the vehicle, and sending the environmental video data through the communication link in response to the driving parameter meeting a preset condition, wherein the driving parameter includes location information, and the driving parameter meeting a preset condition includes: a distance between the location information and the vehicle station being less than or equal to a first preset distance.

20 Claims, 5 Drawing Sheets

When the vehicle is traveling to the vehicle station, the vehicle station establishes the communication link with the vehicle through a remote communication protocol ⟋—— S410

The vehicle station collects environmental data information, and controls the communication media server to transmit the environmental video data to the first processor of the vehicle in a real-time live broadcast manner ⟋—— S420

The first processor decodes in real time and plays the aforementioned environmental video data ⟋—— S430

Stop playing and disconnect the aforementioned communication link when the vehicle leaves the vehicle station ⟋—— S440

(58) Field of Classification Search
    CPC ..... B60W 40/04; B60W 50/14; G01S 13/931;
                            G08B 21/02; G08B 21/18
    See application file for complete search history.

(56)                    References Cited

U.S. PATENT DOCUMENTS

2017/0178511 A1*  6/2017  Berns ..................... G08G 1/144
    2020/0401157 A1*  12/2020  Johnston .............. G05D 1/0285

FOREIGN PATENT DOCUMENTS

CN        102446420  A      5/2012
    CN        202694569  U      1/2013
    CN        103204172  A      7/2013
    CN        103929621  A      7/2014
    CN        104486580  A      4/2015
    CN        108881426  A      11/2018
    CN        109263552  A      1/2019
    CN        109671244  A      4/2019
    CN        110015320  A      7/2019
    CN        111301316  A      6/2020
    KR        101957637  B1     6/2019

OTHER PUBLICATIONS

Office action from U.S. Appl. No. 17/435,749 dated Sep. 28, 2023.
Article, Research on Wireless Sensor Network and its application in
Industrial Field, Chapter 2, IEEE, Standard and ZigBee Protocol
Specifidation, section 1, 4 pgs., dated Nov. 2017.
Written Opinion from PCT/CN2020/132898 dated Aug. 26, 2021.
International Search Report from PCT/CN2020/132898 dated Aug.
26, 2021.
Office action from Chinese Application No. 202080003092.2 dated
Jan. 9, 2024.
Allowance from Chinese Application No. 202080003092.2 dated
May 23, 2024.
Office action from Chinese Application No. 202080003092.2 dated
May 26, 2023.

* cited by examiner

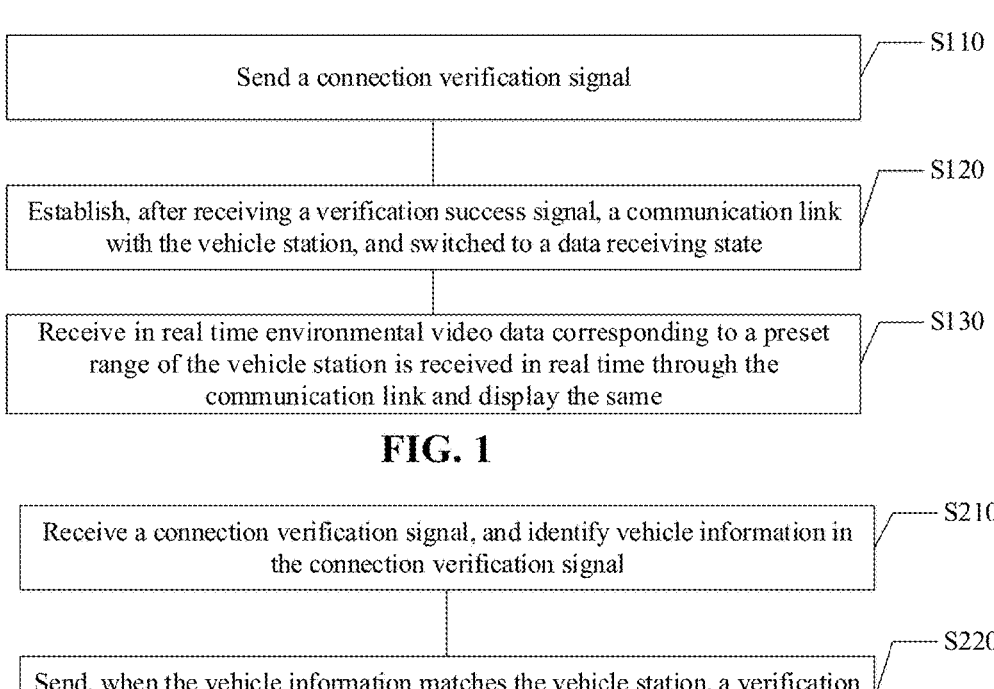

| | |
|---|---|
| Send a connection verification signal | — S110 |
| Establish, after receiving a verification success signal, a communication link with the vehicle station, and switched to a data receiving state | — S120 |
| Receive in real time environmental video data corresponding to a preset range of the vehicle station is received in real time through the communication link and display the same | — S130 |

FIG. 1

| | |
|---|---|
| Receive a connection verification signal, and identify vehicle information in the connection verification signal | — S210 |
| Send, when the vehicle information matches the vehicle station, a verification success signal, and establish a communication link with the vehicle | — S220 |
| Obtain environmental video data corresponding to a preset range of the vehicle station in real time, and send the environmental video data through the communication link | — S230 |

FIG. 2

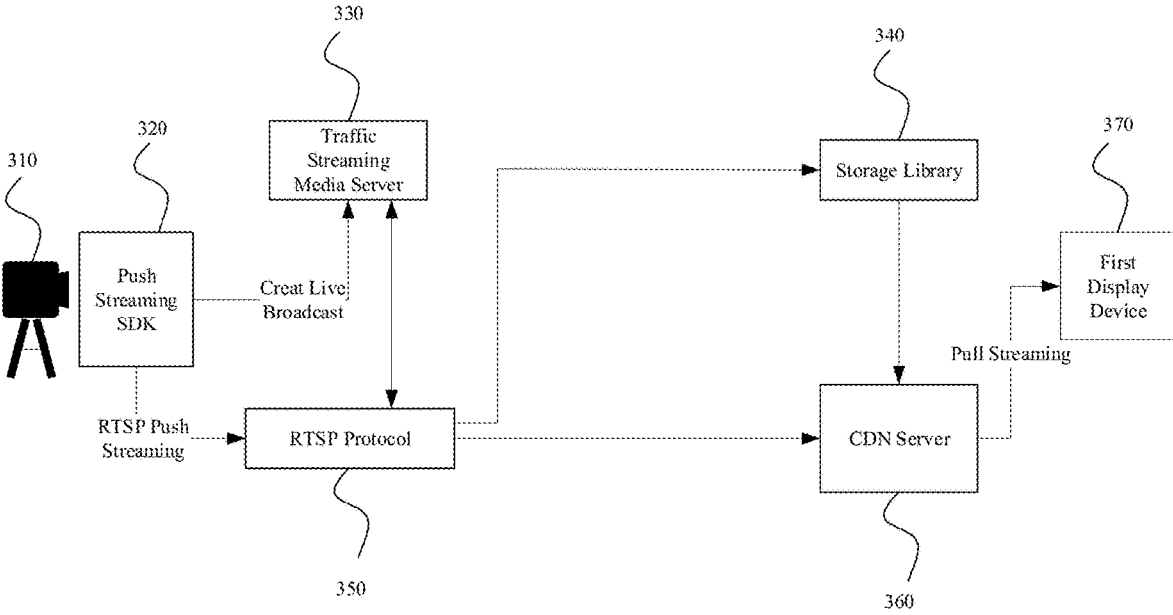

FIG. 3

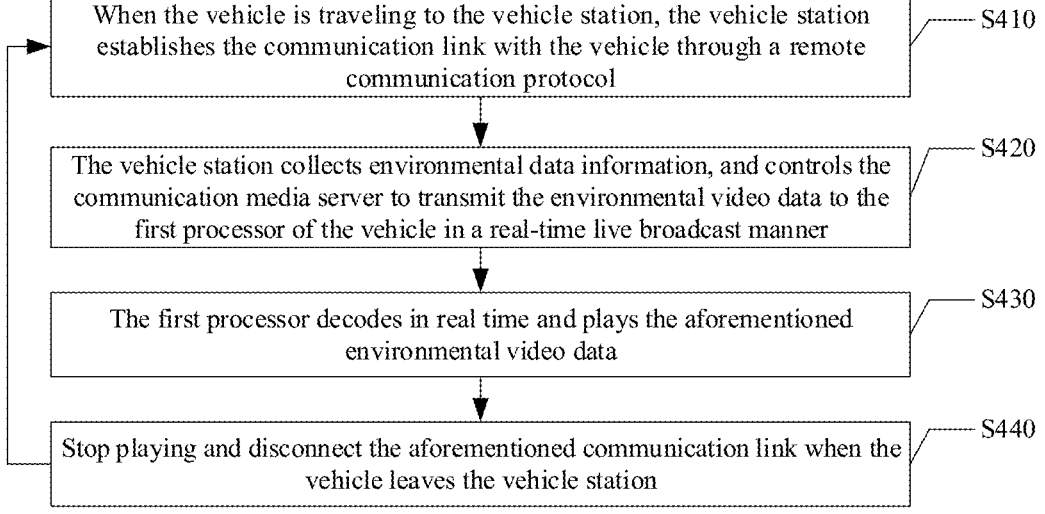

When the vehicle is traveling to the vehicle station, the vehicle station establishes the communication link with the vehicle through a remote communication protocol ——— S410

The vehicle station collects environmental data information, and controls the communication media server to transmit the environmental video data to the first processor of the vehicle in a real-time live broadcast manner ——— S420

The first processor decodes in real time and plays the aforementioned environmental video data ——— S430

Stop playing and disconnect the aforementioned communication link when the vehicle leaves the vehicle station ——— S440

FIG. 4

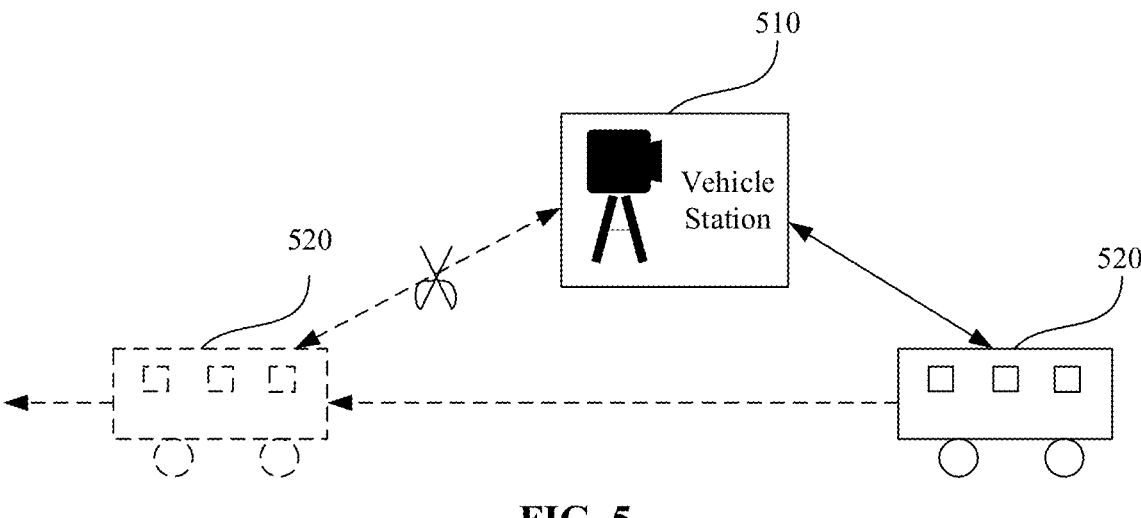

510

Vehicle Station

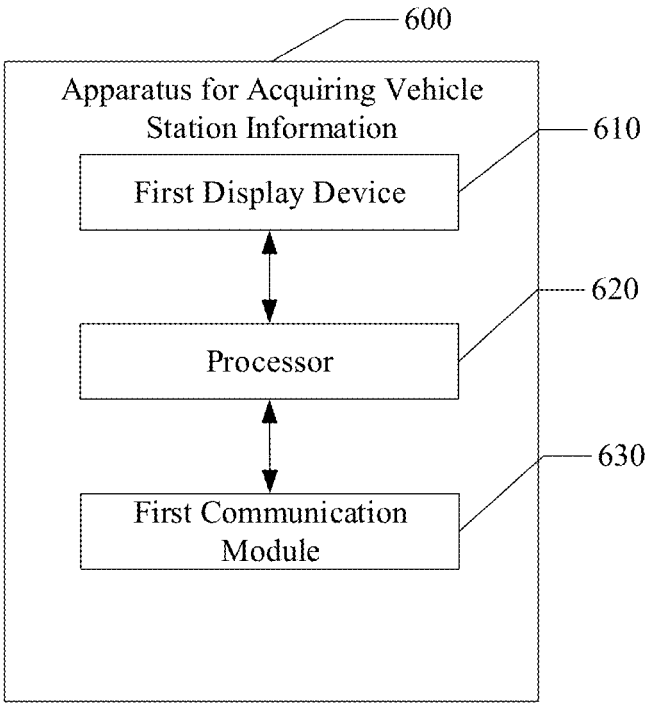

┌─ 600

Apparatus for Acquiring Vehicle Station Information

First Display Device — 610

Processor — 620

First Communication Module — 630

FIG. 6

Control the first communication module to send a connection verification signal — S710

Control the first communication module to establish a communication link with the vehicle station after receiving the verification success signal — S720

The first processor switches to a data receiving state — S730

Receive the environmental video data corresponding to the preset range of the vehicle station in real time through the communication link and display the same — S740

METHOD AND APPARATUS FOR ACQUIRING AND SENDING STATION INFORMATION, AND SIGNAL TRANSCEIVING SYSTEM

CROSS-REFERENCE TO RELATED APPLICATION

The present disclosure is a continuation-in-part application of U.S. application Ser. No. 17/435,749, which is a national phase application under 35 U.S.C. § 371 of International Application No. PCT/CN2020/132898, filed Nov. 30, 2020, where the contents of both of which are incorporated by reference in their entirety herein.

TECHNICAL FIELD

The disclosure relates to the technical field of data transmission and, in particular, to a method and an apparatus for acquiring vehicle station information, a method and an apparatus for sending vehicle station information, a system for transceiving vehicle station information, and a computer-readable storage medium.

BACKGROUND

With the development of public transportation, the application of image capture to public transportation has become more and more widespread.

Most of the related image capture applications are used inside buses, for instance, notifying the driver and passengers whether there is a crisis in the vehicle. However, due to the large size of the bus, there may be blind areas of vision, which will cause dangers since the driver may not be able to identify surrounding traffic conditions.

There is no way that can solve the above-mentioned problems in the related art.

Therefore, it is necessary to provide a method and an apparatus for acquiring vehicle station information, a method and an apparatus for sending vehicle station information, a system for transceiving vehicle station information, and a computer-readable storage medium.

SUMMARY

According to an aspect of the disclosure, there is provided a method for sending vehicle station information, implemented by a first processor provided at a vehicle station, including: establishing a communication link with a vehicle; obtaining environmental video data corresponding to a preset range of the vehicle station; and receiving a driving parameter of the vehicle, and sending the environmental video data through the communication link in response to the driving parameter meeting a preset condition, wherein the driving parameter includes location information, and the driving parameter meeting a preset condition includes: a distance between the location information and the vehicle station being less than or equal to a first preset distance.

According to an aspect of the disclosure, there is provided an apparatus for sending vehicle station information, provided at a vehicle station, including: a processor, a memory and a transceiver; where program instructions stored in the memory and executable by the processor, when executed, direct the processor to perform a method including: establishing a communication link with a vehicle; obtaining environmental video data corresponding to a preset range of the vehicle station; and receiving a driving parameter of the vehicle, and sending the environmental video data through the communication link in response to the driving parameter meeting a preset condition. The driving parameter includes location information, and the driving parameter meeting a preset condition includes: a distance between the location information and the vehicle station being less than or equal to a first preset distance.

According to an aspect of the disclosure, there is provided a non-transitory computer-readable storage medium with a computer program stored thereon, wherein the program, when being executed by a processor, is used for implementing the method for sending vehicle station information according to any one of embodiments disclosed herein.

BRIEF DESCRIPTION OF THE DRAWINGS

The drawings herein, which are incorporated in and constitute a part of this specification, illustrate embodiments consistent with the disclosure, and serve to explain the principles of the disclosure together with the description. Understandably, the drawings in the following description are just some embodiments of the disclosure. For those of ordinary skill in the art, other drawings may be obtained based on these drawings without creative efforts.

FIG. 1 schematically shows a flowchart of the method for acquiring station information according to an exemplary embodiment of the disclosure.

FIG. 2 schematically shows a flowchart of the method for sending station information according to an exemplary embodiment of the disclosure.

FIG. 3 schematically shows a data flow of environmental video data transmission according to an exemplary embodiment of the disclosure.

FIG. 4 schematically shows a flow chart of environmental video data transmission according to an exemplary embodiment of the disclosure.

FIG. 5 schematically shows a diagram of the positions of vehicles and stations according to an exemplary embodiment of the disclosure.

FIG. 6 schematically shows a block diagram of the apparatus for acquiring station information according to an exemplary embodiment of the disclosure.

FIG. 7 schematically shows a flowchart executed by the first processor according to an exemplary embodiment of the disclosure.

DETAILED DESCRIPTION

Figure 8:
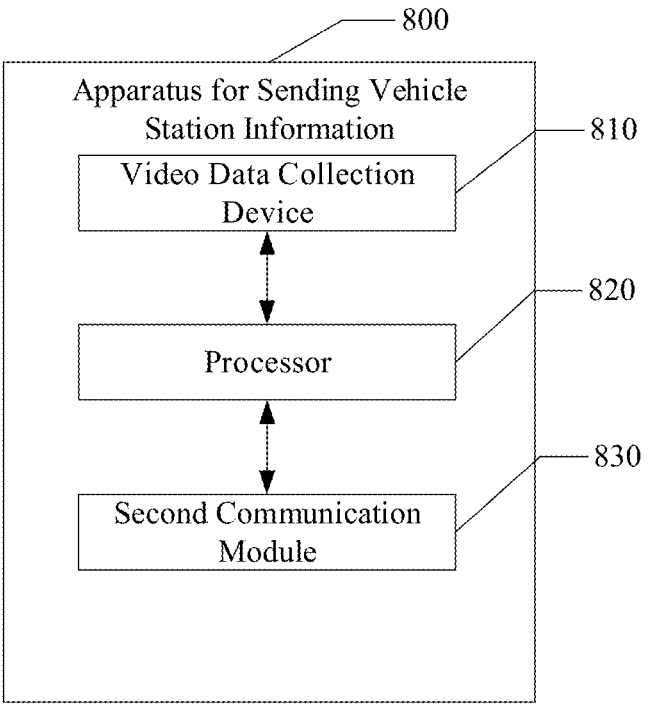
FIG. 8 schematically shows a block diagram of the apparatus for sending station information according to an exemplary embodiment of the disclosure.

Exemplary embodiments will now be described more fully with reference to the accompanying drawings. However, the exemplary embodiments can be implemented in various forms and should not be construed as limited to the embodiments set forth herein. Rather, these embodiments are provided so that this disclosure will be thorough and complete, and will fully convey the concept of the exemplary embodiments to those skilled in the art. The described features, structures, or characteristics can be combined in one or more embodiments in any suitable way.

In addition, the drawings are merely schematic illustrations of the disclosure and are not necessarily drawn to scale. The same reference numerals in the drawings denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

In some exemplary embodiments, a method for acquiring vehicle station information is first provided, which can be applied to a server of a bus. Referring to FIG. 1, the foregoing method for acquiring vehicle station information may include the following.

In S110, a connection verification signal is sent.

In S120, after receiving a verification success signal, a communication link is established with the vehicle station and a data receiving state is switched.

In S130, environmental video data corresponding to a preset range of the vehicle station is received in real time through the communication link and displayed.

According to the method for acquiring vehicle station information provided in some exemplary embodiments, compared to the related art, the vehicle can obtain real-time environmental video data corresponding to the preset range of the vehicle station through the communication link, and display it in the vehicle, so that the driver of the vehicle can acknowledge the road conditions within the preset range of the vehicle station, and make corresponding operations early, thereby improving the safety of driving. At the same time, when the vehicle enters the vehicle station, the driver can acknowledge the surrounding conditions of the vehicle, thereby preventing the danger caused by blind areas of vision.

Hereinafter, each step of the method for acquiring vehicle station information in some exemplary embodiments will be described in more detail with reference to the accompanying drawings and embodiments.

In step S110, the connection verification signal is sent.

In some exemplary embodiments of the disclosure, the vehicle may send the connection verification signal to a second processor of the vehicle station at an interval of a first preset time, where the first preset time may be 200 ms, 100 ms, 120 ms, 150 ms, or the like, or can also be customized according to user needs, which is not specifically limited in the exemplary embodiments.

In some exemplary embodiments, the connection verification signal includes unique identification information of the vehicle, for example, the number of the vehicle, the license plate number of the vehicle, or the like, which are used for determining whether the vehicle matches the vehicle station.

In some other exemplary embodiments, the first processor of the vehicle includes the location information of all vehicle stations that are matched with the vehicle, and the first processor can obtain the current location information of the vehicle and determine a distance between the vehicle and each vehicle station matched with the vehicle based on the location information of the vehicle and the location information of the vehicle station. The first processor may send connection verification information when the distance between the vehicle and any one vehicle station matching the vehicle is less than or equal to a verification distance. Herein, the verification distance may be 100 meters, 200 meters, or the like, or can also be customized according to user needs, which is not specifically limited in the exemplary embodiments.

In step S120, after receiving the verification success signal, the communication link is established with the vehicle station, and the data receiving state is switched.

In some exemplary embodiments of the disclosure, after the vehicle sends the connection verification information to the second processor of the vehicle station, the vehicle station recognizes the connection verification information and, when the connection verification information of the vehicle matches the vehicle station, the first processor of the vehicle is able to establish a communication link with the vehicle station, and at the same time, the first processor of the vehicle is switched to the data receiving state, thereby being ready to receive environmental video data.

In some exemplary embodiments, the communication link can be implemented through protocols such as ZigBee®, wireless fidelity (WiFi®), and Bluetooth®, or can be customized according to user requirements, which is not specifically limited in the exemplary embodiments.

In step S130, the environmental video data corresponding to the preset range of the vehicle station is received in real time through the communication link and displayed.

In some exemplary embodiments of the disclosure, the first processor on the vehicle can receive in real time the environmental video data corresponding to the preset range of the vehicle station sent by the second processor provided at the vehicle station through the above-mentioned communication link, and display the same on the vehicle.

In some other exemplary embodiments of the disclosure, the first processor on the vehicle can receive in real time the environmental video data corresponding to the preset range of the vehicle station sent by a sharing server through the above-mentioned communication link, and display the same on the vehicle. Herein, the sharing server is connected to at least one second processor, that is, the data transmission between the first processor and the second processor is realized through the sharing server, the second processor sends the environmental video data to the sharing server, and the first processor receives the environmental video data sent by the sharing server.

Specifically, after the communication link is established between the first processor and the second processor, the second processor transmits the environmental video data to the sharing server, and then the sharing server transmits the environmental video data to the first processor for being displayed on the vehicle.

In some exemplary embodiments, at least one first display device may be provided on the vehicle for displaying environmental video data. For example, the first display device is provided on the center console of the vehicle, so that the driver can perform operations on the vehicle in advance based on the environmental video data, thereby avoiding danger. It is also possible to hang the first display device on the roof of the vehicle close to the driving position, so that passengers can also avoid danger based on the environmental video data.

In some exemplary embodiments, after the vehicle establishes the communication link with the vehicle station, the first processor of the vehicle may send a driving parameter of the vehicle to the vehicle station, so that the vehicle station can send environmental video data according to the driving parameter. The driving parameter of the vehicle may be collected by a data collection device on the vehicle, and the data collection device is associated with the driving parameter that needs to be collected. For example, when the driving parameter includes location information, the data collection device may include a GPS positioning device; and when the driving parameter includes the speed of the vehicle, the data collection device may include a speed sensor. In the exemplary embodiments, the above-mentioned driving parameter and the corresponding data collection device are not specifically limited.

In some exemplary embodiments, the environmental video data sent by the second processor of the vehicle station is an encoded compressed file. After the vehicle receives the video data, it needs to decode and decompress the environmental video data, and then displays the environmental video data on the first display device. The adoption of encoded compressed file can reduce the size of the transmitted file, accelerate the transmission speed, and further reduce transmission delay of the environmental video data between the vehicle station and the first processor of the vehicle.

In some exemplary embodiments of the disclosure, the video frames in the environmental video data may include I, P, and B frames. Herein, I frame represents the key frame and contains a complete image. P frame represents a difference between a current frame and a previous key frame (or P frame) thereof, that is, a difference frame, and has only the data indicating the difference from the previous frame without complete image dat. B frame is a two-way difference frame, that is, the B frame records difference between the current frame and frames therebefore and thereafter.

In some other exemplary embodiments, the video frames in the environmental video data may only include I and P frames. Since decoding of the B frame needs to rely on the preceding and following video frames, the time delay will be increased during encoding and decoding. Removal of B-frames can not only reduce the time consumption of coding, but also reduce the delay.

In some exemplary embodiments of the disclosure, a detection device may be provided on the vehicle to detect whether there is an interference object within a preset area of the vehicle. Herein, the preset area is area within a certain distance from the vehicle, and the certain distance can be 1 meter, 2 meters, or the like, or can be customized according to user needs, and is not specifically limited in the exemplary embodiments. The detection device may be a sensor for detecting distance, such as a CCD distance sensor, an infrared distance sensor, or the like, which is not specifically limited in the exemplary embodiments.

In some exemplary embodiments of the disclosure, the environmental video data includes parking area information. The first processor can determine whether the parking area is occupied and, if the parking area is occupied, the first processor generates and displays a warning sign, thereby reminding the driver to pay attention when entering the station. For example, if there are passengers waiting to board in the parking area of the vehicle, the warning sign is generated. At the same time, a danger signal can also be fed back to the second processor, so that the second processor of the vehicle station can also control an alarm device to issue an alarm signal, thereby reminding the passengers waiting to board the vehicle to keep far away from the parking area.

In some other exemplary embodiments, the first processor may receive the warning signal sent by the second processor and indicating that the parking area is occupied, and generate the warning sign according to the warning signal. In other words, the process of determining whether the parking area is occupied is implemented by the second processor.

In some exemplary embodiments, the aforementioned interference object may include other vehicles, roadside obstacles, pedestrians, animals, and the like, which are not limited in the exemplary embodiments.

When an interference object is detected within the preset area of the vehicle, the first processor of the vehicle generates the warning signal and sends the warning signal to the second processor of the vehicle station, so that the second processor of the vehicle station can issue an alarm based on the warning signal, thereby reminding passengers to stay away from the vehicle. In some other exemplary embodiments, the first processor of the vehicle may also control the vehicle to issue an alarm according to the above warning signal, so that the driver can avoid the accident in time and reduce the occurrence of accidents.

The disclosure also provides a method for sending vehicle station information, which can be implemented by the second processor of the vehicle station. Referring to FIG. 2, the foregoing method for sending vehicle station information may include the following.

In step S210, a connection verification signal is received, and vehicle information in the connection verification signal is identified.

In step S220, when the vehicle information matches the vehicle station, a verification success signal is sent, and a communication link is established with the vehicle.

In step S230, environmental video data corresponding to a preset range of the vehicle station is obtained in real time, and the environmental video data is sent through the communication link.

Hereinafter, each step of the method for sending vehicle station information in some exemplary embodiments will be described in more detail with reference to the accompanying drawings and embodiments.

In step S210, the connection verification signal is received, and the vehicle information in the connection verification signal is identified.

In some exemplary embodiments of the disclosure, the second processor of the vehicle station receives the connection verification information sent by the first processor of the vehicle, and identifies the vehicle information in the connection verification information. Herein, the vehicle information may include unique identification information, such as the number of the vehicle, the license plate number of the vehicle, or the like, is used for determining whether the vehicle matches the vehicle station.

In some exemplary embodiments, the second processor of the vehicle station receives the connection verification information sent by the vehicle in real time. When the vehicle is driven within the maximum distance for maintaining the communication link between the first processor of the vehicle and the second processor of the vehicle station, the connection verification information sent by the first processor of the vehicle is received, where the above-mentioned maximum distance is determined according to different protocols adopted by the communication link, and is not specifically limited in the exemplary embodiments.

In step S220, when the vehicle information matches the vehicle station, the verification success signal is sent, and the communication link is established with the vehicle.

In some exemplary embodiments of the disclosure, after receiving the connection verification information sent by the first processor of the vehicle, the second processor of the vehicle station identifies the vehicle information in the connection verification information, and determines whether the vehicle information is matched with the vehicle station, and if it is matched, the second processor sends the verification success signal to the first processor of the vehicle, and establishes the communication link with the above-mentioned vehicle.

In some exemplary embodiments, the vehicle information of at least one vehicle that matches the vehicle station may be included to form a matching table. After receiving the connection verification information of the vehicle, the second processor of the vehicle station determines, according to the matching table, whether the vehicle information in the above-mentioned connection verification information matches the vehicle station.

In some exemplary embodiments, the communication link can be implemented through protocols such as ZigBee®, WiFi®, or Bluetooth®, or can be customized according to user requirements, and is not specifically limited in the exemplary embodiments.

In step S230, the environmental video data corresponding to the preset range of the vehicle station is obtained in real time, and the environmental video data is sent through the communication link.

In some exemplary embodiments of the disclosure, the vehicle station can obtain real-time environmental video data corresponding to the preset range of the vehicle station, and the second processor of the vehicle station can receive the environmental video data corresponding to the preset range of the vehicle station and collected by a video data collection device. The above-mentioned video data collection device may include at least one camera, and the camera can be installed at the highest position of the vehicle station to collect relatively accurate environmental video data. The number of cameras can be 1, 2, 3, or the like, or can be customized according to user needs, and is not specifically limited in the exemplary embodiments.

In some exemplary embodiments, the preset range may be an area centered on the vehicle station and 10 meters away from the vehicle station, or may be centered on the vehicle station and 20 meters, 30 meters away from the vehicle station, or the like. The area can also be customized according to the user needs, which is not specifically limited in the exemplary embodiments.

In some exemplary embodiments of the disclosure, the second processor of the vehicle station may use a link server to transmit the above-mentioned environmental video data to the first processor of the vehicle. Referring to FIG. 3, the environmental video data obtained by the camera 310 can be encoded and stored before transmission. The data encoding can use the performance H.265 standard to compress the environmental video data; then the compressed data is encapsulated; after the encoding is completed, push streaming SDK (software development tool) package 320 and a traffic streaming media server 330 are invoked, the push and pull of data can be completed through the RSTP (rapid spanning tree protocol) 350 and sent to the CDN (Content Delivery Network) server 360, and the incoming video data is stored in the storage library 340. Herein, the push streaming refers to a process of transmitting the content packaged in the collection stage to the server, and the pull streaming refers to a process of pulling live content already in the server with a designated address.

When the CDN server 360 responds to the request, the video file is cached at the node, and the obtained environmental video data is then distributed to the network through the CDN server, thereby being acquired by the server of a driving vehicle and displayed on the first display device 370.

Specifically, referring to FIG. 4, step S410 can be performed first. When the vehicle is traveling to the vehicle station, the vehicle station establishes the communication link with the vehicle through a remote communication protocol. Then step S420 is performed, the vehicle station collects environmental data information, and controls the communication media server to transmit the environmental video data to the first processor of the vehicle in a real-time live broadcast manner. Then step S430 is performed, the first processor of the vehicle decodes in real time and plays the aforementioned environmental video data. Finally step S440 is performed to stop playing and disconnect the aforementioned communication link when the vehicle leaves the vehicle station. Then, when the vehicle travels to the next vehicle station, the above steps S410 to S440 continue to be performed.

In some exemplary embodiments of the disclosure, after establishing the communication link with the first processor of the vehicle, the second processor may directly send the environmental video data to the first processor of the vehicle through the communication link. It is also possible to send the environmental video data to the sharing server, and then the sharing server sends the environmental video data to the first processor. There is no specific limitation in the exemplary embodiments.

Herein, the sharing server is connected to at least one first processor, that is, the data transmission between the first processor and the second processor is realized through the sharing server, the second processor sends the environmental video data to the sharing server, and the first processor receives the environmental video data sent by the sharing server.

Specifically, after the communication link is established between the first processor and the second processor, the second processor transmits the environmental video data to the sharing server, and then the sharing server transmits the environmental video data to the first processor for being displayed on the vehicle.

Before sending the environmental video data to the first processor of the vehicle, the second processor of the vehicle station can also receive a driving parameter of the vehicle sent by the first processor of the vehicle, and when the driving parameter meets a preset condition, the second processor sends the environmental video data to the vehicle through communication link.

For example, the above-mentioned driving parameter may include the position information of the vehicle, and the second processor of the vehicle station may calculate a distance between the vehicle and the vehicle station according to the above-mentioned position information. When the above-mentioned distance is less than or equal to a first preset distance, the environmental video data is transmitted to the first processor of the vehicle through the communication link.

For another example, the above-mentioned driving parameter includes a driving direction and a speed of the vehicle, and the second processor of the vehicle station calculates the distance between the vehicle station and the vehicle based on the driving speed, the driving direction, and a maximum distance for maintaining the communication link between the vehicle station and the vehicle, and sends, when the distance between the vehicle station and the vehicle is less than or equal to the first preset distance, the environmental video data to the vehicle. For example, if the maximum distance for maintaining the communication link between the vehicle station and the vehicle is 200 meters, the vehicle travels in the direction closer to the vehicle station, and the travel speed is 10 meters per second, then the distance between the vehicle and the vehicle station can be derived by subtracting a product of travel speed and time from the maximum distance, 200 meters.

In some exemplary embodiments, when the above-mentioned distance is less than or equal to a second preset distance, the second processor may generate vehicle arrival reminder information, so as to make passengers pay attention. The second preset distance may be 5 meters, 10 meters, or the like, which is not specifically limited in the exemplary embodiments.

In some other exemplary embodiments, the second processor of the vehicle station may send environmental video data to the first processor of the vehicle after a preset time after the communication link is established, where the preset time may be 20 seconds, 30 seconds, or the like, or can also be customized according to user needs, which is not specifically limited in the exemplary embodiments.

In some exemplary embodiments, the above-mentioned first preset distance may be 20 meters, 50 meters, 100 meters, or the like, and the first preset distance is less than or equal to the maximum distance for maintaining the communication link between the vehicle station and the vehicle. The first preset distance can also be customized according to user needs, which is not specifically limited in the exemplary embodiments.

In some exemplary embodiments of the disclosure, referring to FIG. 5, the foregoing method for sending vehicle station information further includes detecting the distance between the vehicle and the vehicle station when the foregoing environmental video data is transmitted in real time. When the distance is greater than or equal to a third preset distance, the communication link is disconnected. The third preset distance can be 5 meters, 10 meters, 19 meters, or the like, or can be customized according to user needs, which is not specifically limited in the exemplary embodiments.

In some other exemplary embodiments, when the above-mentioned environmental video data is transmitted in real time, the driving direction of the vehicle is detected. When the driving direction of the vehicle is away from the vehicle station, the communication link between the vehicle 520 and the vehicle station 510 can be directly disconnected, or can also be disconnected after a certain time. The certain time can be 10 seconds, 20 seconds, or the like, or can be customized according to user needs, which is not specifically limited in the exemplary embodiments.

In some exemplary embodiments of the disclosure, the method for sending vehicle station information further includes receiving a warning signal sent by the first processor of the vehicle, so that the alarm device of the vehicle station can issue an alarm in response to the warning signal, and the alarm device may include buzzer, speaker, flashlight, and the like, which is not specifically limited in the exemplary embodiments.

In some exemplary embodiments of the disclosure, the environmental video data includes parking area information, the second processor may determine whether the parking area is occupied, and generates, if the parking area is occupied, a warning signal to make the alarm device issue an alarm according to the warning signal. At the same time, the warning signal can be sent to the first processor of the vehicle, so that the first processor generates a warning sign according to the warning signal and displays it to remind the driver to pay attention when entering the station. For example, if there are passengers waiting to board in the parking area of the vehicle, the warning signal is generated and the alarm device is controlled to issue an alarm.

The disclosure also discloses an apparatus for acquiring vehicle station information. As shown in FIG. 6, the apparatus 600 for acquiring vehicle station information is provided at the vehicle and includes a first display device 610, a first communication module 630, and a first processor 620. The number of the first display device 610 can be one or more, and can be provided on the center console so that the driver can see it easily. Alternatively, the first display device 610 can also be hung on the roof of the vehicle near the driving position, so that passengers can watch the environmental video data corresponding to the preset range of the vehicle station, thereby preventing accidents caused by blind spots when passengers get off the vehicle. The first communication module is configured to complete communication with the second processor of the vehicle station.

In some exemplary embodiments of the disclosure, the first processor 620 is configured to perform the steps as shown in FIG. 7.

In step S710, the first communication module is controlled to send a connection verification signal.

In step S720, the first communication module is controlled to establish a communication link with the vehicle station after receiving the verification success signal.

In step S730, the first processor switches to a data receiving state.

In step S740, the environmental video data corresponding to the preset range of the vehicle station is received in real time through the communication link and displayed.

Specific details of step S710 to step S740 have been described in detail in the above-mentioned method for acquiring vehicle station information, and therefore will not be repeated here.

In some exemplary embodiments, the aforementioned apparatus for acquiring vehicle station information may further include a detection device and a data collection device. The details of the detection device and the data collection device have been described in detail above, and therefore will not be repeated here.

The disclosure also discloses an apparatus for sending vehicle station information, which is provided at the vehicle station and may include a second communication module and a second processor.

Specifically, referring to FIG. 8, the apparatus for sending vehicle station information may also include a video data collection device, and the second communication module 830 is configured to cooperate with the first communication module 610 to establish a communication link between the vehicle and the vehicle station. The video data collection device 810 may be a camera for collecting environmental video data within the preset range of the vehicle station.

Figure 9:
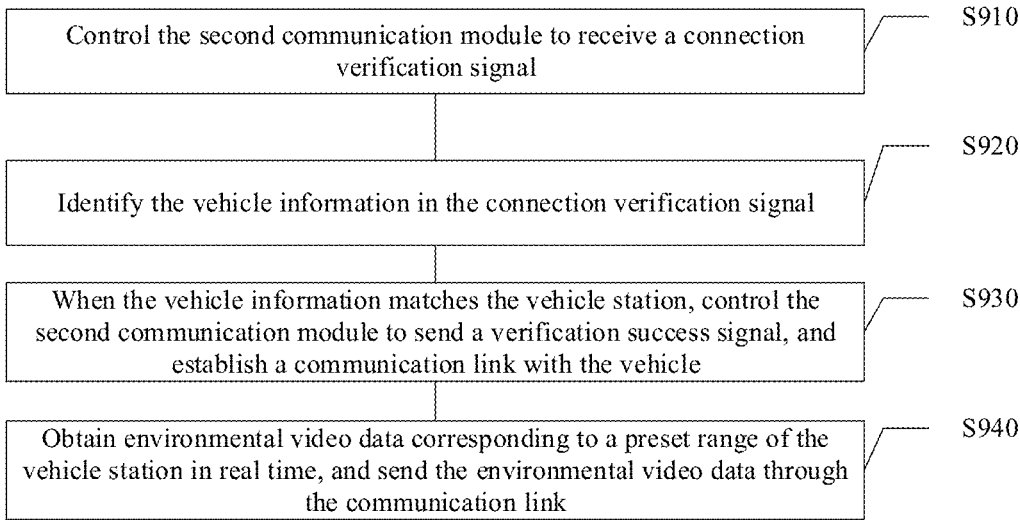
FIG. 9 schematically shows a flowchart executed by the second processor according to an exemplary embodiment of the disclosure.

In some exemplary embodiments, the second processor 820 is configured to execute the steps shown in FIG. 9.

In step S910, the second communication module is controlled to receive a connection verification signal.

In step S920, the vehicle information in the connection verification signal is identified.

In step S930, when the vehicle information matches the vehicle station, the second communication module is controlled to send a verification success signal, and a communication link is established with the vehicle.

In step S940, environmental video data corresponding to a preset range of the vehicle station is obtained in real time, and the environmental video data is sent through the communication link.

Specific details of step S910 to step S940 have been described in detail in the foregoing method for sending vehicle station information, and therefore will not be repeated here.

In some exemplary embodiments, the vehicle station information acquiring device may further include a second display device and an alarm device. The details of the second display device and the alarm device have been described in detail above, and therefore, will not be repeated here.

The disclosure also provides a system for transceiving vehicle station information. The system includes a first processor provided at the vehicle, a second processor provided at the vehicle station, and a relay server. The second processor is in communication with the relay server and is configured to obtain and send the environmental video data corresponding to the preset range of the vehicle station in real time. The first processor is in communication with the relay server and sends connection verification information to the relay server, where the connection verification information includes location information of the vehicle. The relay server is configured to receive the environmental video data and the location information, determine a distance between the vehicle station and the vehicle based on the location information, and when the distance is less than or equal to a fourth preset distance, establish a communication link between the vehicle station and the vehicle according to the connection verification information, and send the environmental video data to the first processor.

In some exemplary embodiments, the relay server is connected to the first processor and the second processor in real time. The relay server identifies the location of each vehicle station, determines the distance between the vehicle and each vehicle station after receiving the connection verification information sent by the first processor, determines the vehicle station whose distance from the vehicle is less than or equal to a fourth preset distance, and determines whether the vehicle station whose distance from the vehicle is less than or equal to the fourth preset distance is matched according to the connection verification information. If the matching is successful, the relay server sends the environmental video data obtained by the vehicle station after the successful matching to the first processor of the vehicle. The fourth preset distance can be 200 meters, 400 meters, or the like, or can also be customized according to user requirements, which is not specifically limited in the exemplary embodiments.

Herein, matching the vehicle station according to the connection verification information has been described in detail in the foregoing method for acquiring vehicle station information, and therefore will not be repeated here.

Figure 10:
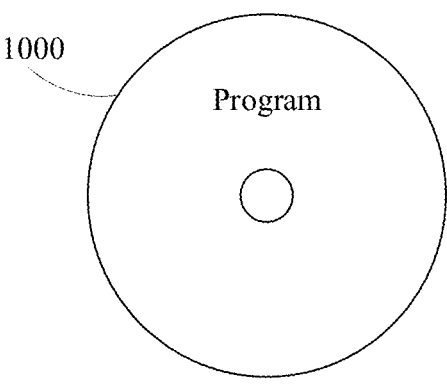
FIG. 10 schematically shows a diagram of the computer-readable storage medium according to some embodiments of the disclosure.

Referring to FIG. 10, a program product 800 for implementing the above method according to the embodiments of the disclosure is illustrated, which can adopt the form of a portable compact disk read-only memory (CD-ROM) and include program codes, and can run in a terminal device, such as a personal computer. However, the program product of the disclosure is not limited thereto. In this disclosure, the readable storage medium can be any tangible non-transitory or non-volatile medium that contains or stores a program, and the program can be used by or in combination with an instruction execution system, apparatus, or device.

The program product can use any combination of one or more readable mediums. The readable medium may be a readable signal medium or a readable storage medium. The readable storage medium may be, for example, but not limited to, an electrical, magnetic, optical, electromagnetic, infrared, or semiconductor system, apparatus, or device, or a combination of any of the above. More specific examples (non-exhaustive list) of readable storage medium include: electrical connections using one or more wires, portable disks, hard disks, random access memory (RAM), read-only memory (ROM), crasable programmable read only memory (EPROM or flash memory), optical fiber, portable compact disk read only memory (CD-ROM), optical storage device, magnetic storage device, or any suitable combination thereof.

The computer-readable signal medium may include a data signal propagated in baseband or as a part of a carrier wave, with readable program codes being carried therein. This propagated data signal can take many forms, including but not limited to electromagnetic signals, optical signals, or any suitable combination thereof. The readable signal medium may also be any readable medium other than a readable storage medium, and the readable medium may send, propagate, or transmit a program for being used by or in combination with the instruction execution system, apparatus, or device.

The program code contained on the readable medium can be transmitted by any suitable medium, including but not limited to wireless, wired, optical cable, RF, or any suitable combination thereof.

The program codes used to perform the operations of the disclosure can be written in any combination of one or more programming languages. The programming languages include object-oriented programming languages, such as Java, C++, and the like, as well as conventional procedural programming language, such as "C" language or similar programming languages. The program codes can be entirely executed on the user's computing device, partly executed on the user's device, executed as an independent software package, partly executed on the user's computing device and partly executed on the remote computing device, or entirely on the remote computing device or server. In a case of the remote computing device, the remote computing device can be connected to a user computing device through any kind of network, including a local area network (LAN) or a wide area network (WAN), or it can be connected to an external computing device (e.g., connected via the Internet using Internet service providers).

In addition, the above-mentioned drawings are merely schematic illustrations of the processing included in the method according to the exemplary embodiments of the disclosure, and are not intended for limitation. It should be understood that the processing shown in the above drawings does not indicate or limit the time sequence of these processing steps. In addition, it should be understood that, for example, these processes can be executed synchronously or asynchronously in multiple modules.

Those skilled in the art will easily think of other embodiments of the disclosure after understanding the specification and practicing the embodiments disclosed herein. The disclosure is intended to cover any variations, uses, or adaptive changes of the disclosure, as long as these variations, uses, or adaptive changes follow the general principles of the disclosure and include common knowledge or conventional technical means in the technical field that are not disclosed in the disclosure. The description and the embodiments are only regarded as exemplary, and the true scope and spirit of the disclosure are limited by the claims.

It should be understood that the disclosure is not limited to the precise structure that has been described above and shown in the drawings, and various modifications and changes can be made without departing from its scope. The scope of the disclosure is limited only by the appended claims.

13

14

What is claimed is:

1. A method for sending vehicle station information, implemented by a first processor provided at a vehicle station, comprising:

establishing a communication link with a vehicle;

obtaining environmental video data corresponding to a preset range of the vehicle station; and receiving a driving parameter of the vehicle, and sending the environmental video data through the communication link in response to the driving parameter meeting a preset condition, wherein the driving parameter comprises location information, and the driving parameter meeting a preset condition comprises:

a distance between the location information and the vehicle station being less than or equal to a first preset distance.

2. The method according to claim 1, further comprising:

receiving a connection verification signal, and identifying vehicle information in the connection verification signal; and sending, in response to the vehicle information matching the vehicle station, a verification success signal before establishing the communication link.

3. The method according to claim 1, wherein the driving parameter further comprises a driving direction of the vehicle, and the method further comprises:

disconnecting the communication link in response to the driving direction of the vehicle being a direction away from the vehicle station.

4. The method according to claim 1, wherein sending the environmental video data through the communication link comprises:

sending the environmental video data to the vehicle through the communication link in response to a second preset time lapsing after the communication link is established with the vehicle.

5. The method according to claim 1, wherein sending the environmental video data through the communication link comprises:

sending, through the communication link, the environmental video data to a second processor provided at the vehicle.

6. The method according to claim 1, wherein sending the environmental video data through the communication link comprises:

sending the environmental video data to a sharing server through the communication link; wherein the sharing server is in communication connection with at least one second processor provided at the vehicle.

7. The method according to claim 1, wherein the environmental video data comprises parking area information, and the method further comprises:

determining whether a parking area is occupied according to the parking area information; and in response to determining that the parking area is occupied, generating a warning signal to cause an alarm device at the vehicle station to issue an alarm, and sending the warning signal to a second processor of the vehicle.

8. The method according to claim 1, further comprising:

detecting a distance between the vehicle and the vehicle station; and generating a vehicle arrival reminder signal in response to the distance between the vehicle and the vehicle station being less than or equal to a second preset distance.

9. The method according to claim 1, further comprising:

detecting a distance between the vehicle and the vehicle station; and disconnecting the communication link in response to the distance between the vehicle and the vehicle station being greater than or equal to a third preset distance.

10. An apparatus for sending vehicle station information, provided at a vehicle station, comprising: a processor, a memory and a transceiver, wherein program instructions stored in the memory and executable by the processor, when executed, direct the processor to perform a method comprising:

establishing a communication link with a vehicle;

obtaining environmental video data corresponding to a preset range of the vehicle station; and receiving a driving parameter of the vehicle, and sending the environmental video data through the communication link in response to the driving parameter meeting a preset condition, wherein the driving parameter comprises location information, and the driving parameter meeting a preset condition comprises:

a distance between the location information and the vehicle station being less than or equal to a first preset distance.

11. The apparatus according to claim 10, wherein the processor is further directed to:

receive a connection verification signal, and identify vehicle information in the connection verification signal; and send, in response to the vehicle information matching the vehicle station, a verification success signal before establishing the communication link.

12. The apparatus according to claim 10, wherein the driving parameter further comprises a driving direction of the vehicle, and the processor is further directed to:

disconnect the communication link in response to the driving direction of the vehicle being a direction away from the vehicle station.

13. The apparatus according to claim 10, wherein the processor is specifically directed to:

send the environmental video data to the vehicle through the communication link in response to a second preset time lapsing after the communication link is established with the vehicle.

14. The apparatus according to claim 10, wherein the processor is specifically directed to:

send, through the communication link, the environmental video data to a second processor provided at the vehicle.

15. The apparatus according to claim 10, wherein the processor is specifically directed to:

send the environmental video data to a sharing server through the communication link; wherein the sharing server is in communication connection with at least one second processor provided at the vehicle.

16. The apparatus according to claim 10, wherein the environmental video data comprises parking area information, and the processor is further directed to:

determine whether a parking area is occupied according to the parking area information; and in response to determining that the parking area is occupied, generate a warning signal to cause an alarm device at the vehicle station to issue an alarm, and send the warning signal to a second processor of the vehicle.

17. The apparatus according to claim 10, wherein the processor is further directed to:

detect a distance between the vehicle and the vehicle station; and generate a vehicle arrival reminder signal in response to the distance between the vehicle and the vehicle station being less than or equal to a second preset distance.

18. The apparatus according to claim 10, wherein the processor is further directed to:

detect a distance between the vehicle and the vehicle station; and disconnect the communication link in response to the distance between the vehicle and the vehicle station being greater than or equal to a third preset distance.

19. The apparatus according to claim 10, wherein the communication link is established through a local area network (LAN) or a wide area network (WAN).

20. A non-transitory computer-readable storage medium with a computer program stored thereon, wherein the computer program, when executed by a processor, directs the processor to perform a method comprising:

establishing a communication link with a vehicle;

obtaining environmental video data corresponding to a preset range of the vehicle station; and receiving a driving parameter of the vehicle, and sending the environmental video data through the communication link in response to the driving parameter meeting a preset condition, wherein the driving parameter comprises location information, and the driving parameter meeting a preset condition comprises:

a distance between the location information and the vehicle station being less than or equal to a first preset distance.

* * * * *